(12) United States Patent
Larson

(10) Patent No.: US 9,673,988 B2
(45) Date of Patent: *Jun. 6, 2017

(54) SYSTEMS AND METHODS FOR CERTIFYING DEVICES TO COMMUNICATE SECURELY

(71) Applicant: VirnetX, Inc., Zephyr Cove, NV (US)

(72) Inventor: Victor Larson, Fairfax, VA (US)

(73) Assignee: VirnetX, Inc., Zephyr Cove, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/827,243

(22) Filed: Aug. 14, 2015

(65) Prior Publication Data

US 2015/0358168 A1    Dec. 10, 2015

Related U.S. Application Data

(63) Continuation of application No. 14/294,476, filed on Jun. 3, 2014, now Pat. No. 9,143,490, which is a
(Continued)

(51) Int. Cl.
*H04L 12/28* (2006.01)
*H04L 9/32* (2006.01)
*H04L 12/927* (2013.01)
*H04L 29/06* (2006.01)
*H04L 12/24* (2006.01)

(52) U.S. Cl.
CPC ........ *H04L 9/3263* (2013.01); *H04L 41/0806* (2013.01); *H04L 41/12* (2013.01); *H04L 47/805* (2013.01); *H04L 63/0272* (2013.01); *H04L 63/0428* (2013.01); *H04L 63/061* (2013.01); *H04L 63/0823* (2013.01); *H04L 63/04* (2013.01); *H04L 63/0435* (2013.01);
(Continued)

(58) Field of Classification Search
None
See application file for complete search history.

(56) References Cited

U.S. PATENT DOCUMENTS

| 5,048,087 A | 9/1991 | Trbovich |
| 5,638,434 A | 6/1997 | Gottlieb et al. |

(Continued)

FOREIGN PATENT DOCUMENTS

CA    2228687    4/1999

OTHER PUBLICATIONS

International Search Report dated Jun. 5, 2002 from Corresponding PCT Application No. PCT/US02/001070.
(Continued)

*Primary Examiner* — Bob Phunkulh
(74) *Attorney, Agent, or Firm* — Finnegan, Henderson, Farabow, Garrett & Dunner LLP

(57) ABSTRACT

A virtual private network (VPN) over a telecommunications network is created by sending a request from a first VPN device to a second VPN device for establishing a VPN between the first and second VPN devices. The request includes a first signed certificate having a verified VPN parameter for the first VPN device. A reply is received at the first VPN device from the second VPN device that includes a second signed certificate having a verified VPN parameter for the second VPN device. The VPN is established between the first and second VPN devices based on each verified VPN parameter for each of the first and second VPN devices.

28 Claims, 6 Drawing Sheets

Related U.S. Application Data continuation of application No. 13/620,368, filed on Sep. 14, 2012, now Pat. No. 8,780,906, which is a continuation of application No. 13/110,353, filed on May 18, 2011, now Pat. No. 8,761,168, which is a continuation of application No. 11/532,002, filed on Sep. 14, 2006, now Pat. No. 7,986,688, which is a continuation of application No. 09/874,258, filed on Jun. 6, 2001, now Pat. No. 7,209,479.

(60) Provisional application No. 60/262,036, filed on Jan. 18, 2001.

(52) U.S. Cl.
CPC .............. *H04L 63/12* (2013.01); *H04L 63/20* (2013.01); *H04L 2209/64* (2013.01)

(56) References Cited

U.S. PATENT DOCUMENTS

| | | |
|---|---|---|
| 5,768,271 A | 6/1998 | Seid et al. |
| 5,870,744 A | 2/1999 | Sprague |
| 6,012,100 A | 1/2000 | Frailong et al. |
| 6,055,575 A | 4/2000 | Paulsen et al. |
| 6,061,451 A | 5/2000 | Muratani et al. |
| 6,079,020 A | 6/2000 | Liu |
| 6,092,113 A | 7/2000 | Maeshima et al. |
| 6,092,200 A | 7/2000 | Muniyappa et al. |
| 6,105,027 A | 8/2000 | Schneider et al. |
| 6,119,171 A | 9/2000 | Alkhatib |
| 6,175,622 B1 | 1/2001 | Chiniwala et al. |
| 6,178,505 B1 | 1/2001 | Schneider et al. |
| 6,353,886 B1 | 3/2002 | Howard et al. |
| 6,408,336 B1 | 6/2002 | Schneider et al. |
| 6,408,351 B1 | 6/2002 | Hamdi et al. |
| 6,487,663 B1 | 11/2002 | Jaisimha |
| 6,675,225 B1 | 1/2004 | Genty et al. |
| 6,751,729 B1 | 6/2004 | Giniger et al. |
| 6,785,728 B1 | 8/2004 | Schneider et al. |
| 6,795,917 B1 | 9/2004 | Ylonen |
| 6,978,364 B1 | 12/2005 | Balaz et al. |
| 7,797,552 B2 | 9/2010 | Kahn et al. |
| 2001/0042050 A1 | 11/2001 | Fletcher et al. |
| 2002/0116708 A1 | 8/2002 | Morris et al. |
| 2003/0206631 A1 | 11/2003 | Candelore |
| 2008/0120675 A1 | 5/2008 | Morad et al. |
| 2008/0120676 A1 | 5/2008 | Morad et al. |
| 2008/0137848 A1 | 6/2008 | Kocher et al. |
| 2010/0104002 A1 | 4/2010 | Kreiner et al. |

OTHER PUBLICATIONS

Non-Final Office Action dated Feb. 24, 2005 cited in corresponding U.S. Appl. No. 09/874,258.
Non-Final Office Action dated Aug. 9, 2005 cited in corresponding U.S. Appl. No. 09/874,258.
Final Office Action dated Feb. 9, 2006 cited in corresponding U.S. Appl. No. 09/874,258.
Non-Final Office Action dated Apr. 9, 2008 cited in corresponding U.S. Appl. No. 11/532,002.
Non-Final Office Action dated Jul. 18, 2008 cited in corresponding U.S. Appl. No. 11/532,002.
Non-Final Office Action dated Jan. 7, 2010 cited in corresponding U.S. Appl. No. 11/532,002.
Non-Final Office Action dated Sep. 17, 2010 cited in corresponding U.S. Appl. No. 11/532,002.
European Search Report dated Feb. 10, 2012 from Corresponding European Patent Application No. 10012248.0.
European Search Report dated Feb. 9, 2012 from Corresponding European Patent Application No. 10012245.6.
Decision on Appeal in Control No. 95/001,746 dated Feb. 11, 1016 (61 Pages).
European Office Action dated Mar. 30, 2015 from corresponding European Application No. 11005793.2.
IPR2014-00403—Final Written Decision, dated Jul. 29, 2015, 41 pages.
IPR2014-00481—Final Written Decision, dated Aug. 24, 2015, 47 pages.
IPR2014-00482—Final Written Decision, dated Aug. 24, 2015, 26 pages.
IPR2015-00810—Final Written Decision, dated Aug. 30, 2016, 58 pages.
IPR2015-00812—Final Written Decision, dated Aug. 30, 2016, 42 pages.
IPR2015-00870—Final Written Decision, dated Sep. 28, 2016, 62 pages.
IPR2015-00871—Final Written Decision, dated Sep. 28, 2016, 78 pages.
IPR2015-00811—Final Written Decision, dated Sep. 8, 2016, 78 pages.
IPR2015-00866—Final Written Decision, dated Sep. 28, 2016, 46 pages.
IPR2015-00868—Final Written Decision, dated Sep. 28, 2016, 51 pages.
IPR2015-01009—Final Written Decision, dated Oct. 18, 2016, 39 pages.
IPR2015-01010—Final Written Decision, dated Oct. 18, 2016, 19 pages.
IPR2015-01046—Final Written Decision, dated Sep. 9, 2016, 36 pages.
IPR2015-01047—Final Written Decision, dated Sep. 9, 2016, 38 pages.
Decision in Virnetx v. Apple Inc. No. 15-211, 1213, 1279, 1281 (Fed. Cir. Dec. 9, 2016), 2 pages.
Decision in Virnetx v. Apple Inc. No. 15-1934, 1935 (Fed. Cir. Dec. 9, 2016), 21 pages.
Decision in Virnetx v. Apple Inc. No. 16-1480 (Fed. Cir. Dec. 9, 2016), 2 pages.

SYSTEMS AND METHODS FOR CERTIFYING DEVICES TO COMMUNICATE SECURELY

CROSS REFERENCE TO RELATED APPLICATIONS

The present application claims the benefit of priority under 35 U.S.C. §120 as a continuation of U.S. patent application Ser. No. 14/294,476, filed on Jun. 3, 2014, which claims the benefit of priority under §120 as a continuation of U.S. patent application Ser. No. 13/620,368, filed on Sep. 14, 2012, now U.S. Pat. No. 8,780,906, issued on Jul. 15, 2014, which claims the benefit of priority under §120 as a continuation of U.S. patent application Ser. No. 13/110,353, filed on May 18, 2011, now U.S. Pat. No. 8,761,168, issued on Jun. 24, 2014, which claims the benefit of priority under §120 as a continuation of U.S. patent application Ser. No. 11/532,002, filed on Sep. 14, 2006, now U.S. Pat. No. 7,986,688, issued on Jul. 26, 2011, which claims the benefit of priority under §120 as a continuation of U.S. patent application Ser. No. 09/874,258, filed on Jun. 6, 2001, now U.S. Pat. No. 7,209,479, issued on Apr. 24, 2007, which claims the benefit of priority under §119 as a nonprovisional of U.S. Provisional Patent Application Ser. No. 60/262,036, filed on Jan. 18, 2001, now expired. All of the foregoing disclosures are hereby incorporated by reference in their entirety for all purposes.

BACKGROUND OF THE APPLICATION

1. Technical Field

The present application relates to the field of telecommunications. More particularly, the present application relates to a system and method for establishing a virtual private network (VPN) over a telecommunications network.

2. Description of the Related Art

Currently, there are two basic approaches that are used for setting up a virtual private network (VPN) between two sites. The first approach is a distributed management approach that involves each site independently configuring a local VPN device, such as a network access server (NAS). Critical network parameters are then communicated between each site for configuring the VPN. The second approach is a centralized management approach that uses software at a centralized location to enter the configuration parameters for each VPN device when a VPN is to be established. The centralized software then uploads the configuration files into each respective VPN device so that the VPN can be established.

For the distributed management approach, each site independently requests a certificate from a certification authority tier each VPN device that is controlled by the requesting site. The certification authority verifies the information contained in the certificate request by verifying the identity and ownership of the public key for the VPN device. The certification authority then generates a certificate and delivers the certificate to the requesting site. A system administrator at the requesting site then installs a VPN device using the new certificate. Subsequently when a VPN is established between the two sites, detailed network parameters are communicated between system administrators for each site, such as a telephone, for each VPN that is established. The communicated network parameters are then manually entered into each respective VPN device by the respective system administrators for each VPN that is to be established.

FIG. 1 shows a system block diagram illustrating a specific example of a conventional distributed approach for establishing an Internet Protocol Security (IPSEC) LAN-to-LAN VPN connection between, for example, a Company A and a Company B. Company A and Company B each has a separate respective local area network (LAN) LAN 101 and LAN 102. Terminal devices, such as personal computers (PCs), are connected in a well-known manner to each respective LAN. While only one terminal device 103 and one terminal device 104 are shown respectively connected to LAN 101 and LAN 102 in FIG. 1, it should be understood that a plurality of terminal devices can be connected to each LAN, but are not shown. Moreover, it should be understood that other well-known terminal devices other than PCs could be connected in a well-known manner to LAN 101 and LAN 102, such as printers, databases, etc.

Company A and Company B are each respectively connected to a telecommunications network 100, such as the Internet, through VPN devices 105 and 106, such as a network access servers (NASs), a firewall or a VPN gateway. While only VPN devices 105 and 106 are shown in FIG. 1, it should be understood that each of Company A and Company B can be connected in a well-known manner to telecommunications network 100 through a plurality of VPN devices. Telecommunications network 100 includes routers 107-109. While only routers 107-109 are shown in FIG. 1 for simplicity, it should be understood that telecommunications network 100 includes a variety of well-known telecommunications devices that are not shown.

When, for example, a user at terminal device 103 desires to establish a VPN to a user at terminal 104, each respective user contacts the local system administrator and requests that such a VPN be established. Detailed network parameters must be provided at both sides of the VPN tunnel for securely establishing the range of IP addresses that are to be routed into the VPN link or accepted from the VPN link. The respective system administrators for each site then communicate the detailed parameters, for example, over a voice or facsimile link 110. Each system administrator manually enters the communicated network parameters into a VPN configuration file for the desired VPN at the local VPN device. The configuration file is then used by conventional LAN-to-LAN VPN software for establishing the desired VPN. Exemplary parameter information contained in a VPN configuration file at Company A includes:

Left_ID=companyA.com
Left_Key=companyA.com.x509
Left_IP=10.0.0.1
LeftSubNet=192.168.0.0/255.255.255.0
LeftNextHop=10.0.0.2;
Right_ID=companyB.com
Right_Key=companyBcom.x509
RightIP=10.0.1.1
RightSubNet=192.168.1.0/255.255.255.0
RightNextHop=10.0.1.2
IPsec_Type=tunnel-esp-3des-md5-96
ReKeyRate=8 h
AuthenticationType=ike-rsasig Exemplary parameter information contained in a VPN configuration file at Company B includes:

Left_ID=companyB.com
Left_Key=companyB.com.x509
Left_IP=10.0.1.1
LeftSubNet=192.168.1.0/255.255.255.0
LeftNextHop=10.0.1.2
Right_ID=companyA.com
Right_Key=companyA.com.x509

RightIP:=10.0.0.1
RightSubNet=192.168.0.0/255.255.255.0
RightNextHop=10.0.0.2
IPsec_Type=unnel-esp-3des-md5-96
ReKeyRate=8 h
AuthenticationType=ike-rsasig Each new VPN defined between the LANs of Company A and Company B requires that network parameters that are similar to those that are listed above be entered into each respective VPN device. Because specific parameters about a destination LAN that will be connected to through the VPN are required, merely trusting the "other side" to provide the required parameters could result in an invalid range of IP addresses being provided to a site. Moreover, a middleman could, from the point of view of each end of the VPN, pretend to be the "other" system administrator and cause the VPN to be routed through a particular node, thereby making the information being conveyed over the VPN vulnerable to a "man-in-the-middle" attack.

Another problem associated with a conventional distributed approach for establishing a VPN is that often times there is a lengthy wait before a LAN-to-LAN VPN is established because key network administration personnel at the two respective LAN sites must communicate and manually enter the correct network parameters into each local VPN gateway so that the VPN can be established. In many cases, the effort required for establishing a LAN-to-LAN VPN is so burdensome, that a VPN is avoided entirely, and network encryption/authentication is addressed at the application layer using the secure sockets layer (SSL) protocol.

The second approach for conventionally establishing a VPN is the centralized management approach. FIG. 2 shows a system block diagram illustrating a conventional centralized management approach for establishing a VPN. In FIG. 2, a centralized authority 201 completely controls and configures all VPN devices, such as VPN devices 202-204, at remote sites that are connected to a telecommunications network 205, such as the Internet. When certificates are used, centralized authority 201 processes all certificate request information and acts as the certificate authority. Alternatively, outside certificate authority can be used for verifying the information and for generating a certificate. A system administrator from centralized authority 201 then installs the certificate in the VPN device of an entity requesting a certificate. Additionally, an administrator at the centralized authority site also enters network parameters for each VPN device into a single piece of software that is stored centrally at centralized authority 201. When a user at a remote site, such as the remote site associated with VPN device 202, desires that a VPN be established with, for example, VPN device 204, the user contacts centralized authority 201 at 206 using, for example, a telephone call, e-mail or by facsimile, requesting the VPN. A system administrator at centralized authority 201 configures each VPN device based on the respective parameters associated with each VPN device. The configuration is then remotely uploaded into each respective VPN device at 207 and 208 so that a VPN can be established between VPN device 202 and VPN device 204.

One problem associated with the centralized management approach is the inherent time delay that a user experiences between the time that a VPN is requested and the time that the VPN is finally established. Another problem is that each remote site does not have control over the VPN device located at the site.

There are many currently-available VPN software solutions that simplify the administration and connection of a large number of clients (i.e., single IP address remote computers) for a corporate LAN, that is, when the IP address of the VPN tunnel device and the client address of the VPN are the same. In such situations, authentication of VPN parameters by a third party is not important.

Nevertheless, in view of the foregoing, what is needed is a way to simplify administration for establishing a large number of LAN-to-LAN VPNs. Moreover, what is needed is an approach to configuring LAN-to-LAN VPNs that does not require a LAN organization to manually configure parameters for each new tunnel, or to give up control of their VPN device to a central authority.

SUMMARY

The present application provides a way to simplify administration for establishing a large number of VPNs. Additionally, the present application allows VPN nodes to pre-configure and pre-authenticate key VPN parameters and easily manage VPN tunnels based on name pairs, thereby avoiding the need to enter new parameters for each new VPN tunnel.

Some advantages of the present application are provided by a method for creating a virtual private network (VPN) over a telecommunications network, such as the Internet, in which a request is sent from a first VPN device to a second VPN device for establishing a VPN between the first and second VPN devices. The request for establishing the VPN is sent in response to a request received from a client device that is associated with the first VPN device. The request received from the client device includes a destination designation, and preferably includes a source/destination designation. Alternatively, the request received from the client device includes a wildcard designation for one of the source designation and the destination designation. The request sent to the second VPN device includes a first signed certificate having one verified VPN parameter for the first VPN device. The second VPN device verifies the contents of the first signed certificate. A reply is then received at the first VPN device from the second VPN device that includes a second signed certificate having one verified VPN parameter for the second VPN device. The first VPN device verifies the contents of the second signed certificate. The VPN is established between the first and second VPN devices based on each verified VPN parameter for each of the first and second VPN devices.

Another aspect provides a method for creating a VPN over a telecommunications network by sending a certificate request for a virtual private network device to a certification authority connected to the telecommunications network. In one aspect, the certificate request includes one VPN parameter that will be used by the VPN device for establishing a VPN over the telecommunications network. For example, the certificate request includes one telecommunications network address that the VPN device will use as a client network address for a VPN established through the VPN device. Alternatively, the certificate request can include a range of telecommunications network addresses that the VPN device will use as client network addresses for VPNs established through the VPN device. A signed certification is then received from the certification authority that contains the one VPN parameter contained in the certificate request. Subsequently, the VPN device is configured to operate in accordance with the one VPN parameter contained in the signed certificate.

Yet another aspect provides a VPN device, such as a VPN concentrator, a router, a firewall or a host computer, that includes a memory containing a certificate that has been signed by a certification authority. The signed certificate contains a VPN parameter for the VPN device that has been verified by the certification authority. The VPN device also includes a processor that receives a request for establishing a VPN. The processor responds to the request by sending the signed certificate contained in the memory over a telecommunications network, such as the Internet, to a second VPN device based on the received request. When the request for establishing a VPN is received from the second VPN device, the request contains a signed certificate for the second VPN device. Accordingly, the signed certificate for the second VPN device contains at least one VPN parameter for the second VPN device that has been verified by a certification authority. The processor verifies the signed certificate for the second VPN device, preferably using a public key associated with the second VPN device, before sending the signed certificate to the second VPN device. When the request for establishing a VPN is received from a client device associated with the VPN device, the processor sends a request to an on-line database connected to the telecommunications network for obtaining a secure domain name address associated with the second. VPN device. The processor then sends the signed certificate over the telecommunications network to the secure domain name address associated with the second VPN device.

BRIEF DESCRIPTION OF THE DRAWINGS

The features herein are illustrated by way of example and not limitation in the accompanying figures in which like reference numerals indicate similar elements and in FIG. 1 shows a system block diagram illustrating a specific example of a conventional distributed approach for establishing an IPSEC LAN-to-LAN VPN connection between a company A and a company B.

DETAILED DESCRIPTION

Figure 1:
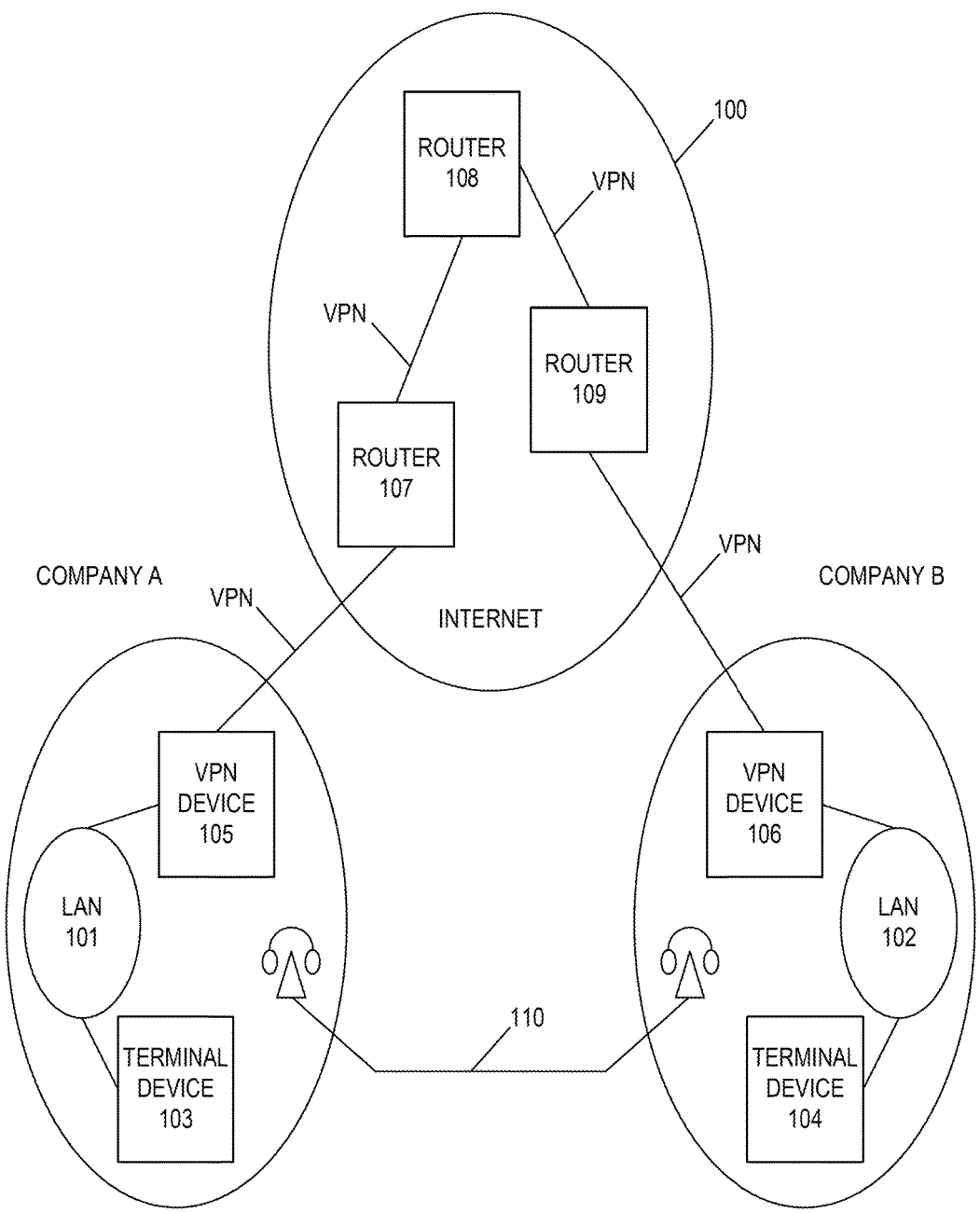
Figure 2:
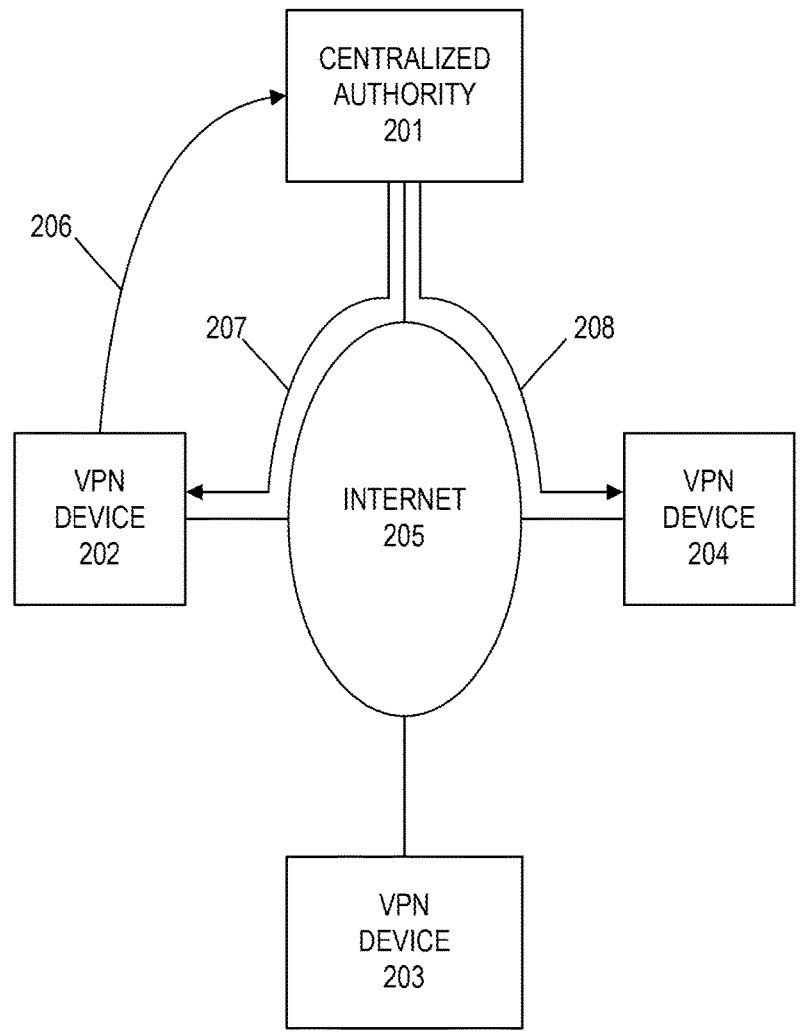
FIG. 2 shows a system block diagram illustrating a conventional centralized. management approach for establishing a VPN.

The present application allows each site to independently control a virtual private network (VPN) device, such as a VPN concentrator, a router, a firewall or a host computer, thereby eliminating the need for communicating detailed network parameters to another site each time a new VPN tunnel is established to the other site. According to one embodiment, a certification authority verifies and signs the VPN parameters associated with each site, and which are then used for securely exchanging VPN parameters when a VPN tunnel is established. For example, one VPN parameter that the certification authority verifies and cryptographically signs is a block of Internet IP addresses that are used as client network addresses at each side of a VPN tunnel. Consequently, each side of the VPN can securely exchange all VPN parameters with the added security of having the certificate authority verify the VPN client network address block. Moreover, new VPN tunnels are specified by a VPN name pair instead of being manually entered with network parameters each time a tunnel is established.

Thus, the features herein may eliminate the need for skilled network technician personnel to communicate key parameters between sites in order to set up a VPN tunnel between two organizations. Skilled network technicians for each organization can therefore perform their tasks independently, thereby removing delays caused by using the conventional approach of communicating network parameters between organizations. Further, the interface for setting up new VPN tunnels and monitoring the status of existing VPN tunnels is sufficiently simple for non-technical labor to maintain.

When a VPN device, such as a VPN concentrator, a router, a firewall or a host computer, is installed on a LAN and is connected to a telecommunications network, such as the Internet, the VPN device is configured using basic network configuration parameters that become part of a certificate request. The certificate request is sent to a certification authority, which verifies the information contained in the certificate request, such as the identity of the VPN device, the ownership of the public key for the VPN device, the range of Internet IP addresses that will be used for the VPN device, and the network parameters for the VPN device. The certification authority then cryptographically signs a certificate containing the network parameters contained in the request. The installation is completed by installing the signed certificate on the VPN device, and defining default VPN connection policies, or rules, such as local name to remote name pairs, bandwidth limitations, and Quality of Service (QoS) parameters, so that a VPN can be established based on the connection policies. Subsequently, a user can securely set up LAN-to-LAN VPNs with another site by merely specifying a local name to remote name pair contained in the connection policies. In the situation when the block of Internet addresses used by a particular VPN device changes, a new certificate request may be required for the new block of Internet addresses. The certification authority then verifies the new information associated with the VPN device, cryptographically signs a new certificate, and binds the identity with the new parameters to a secure domain name associated with the VPN device.

Figure 3:
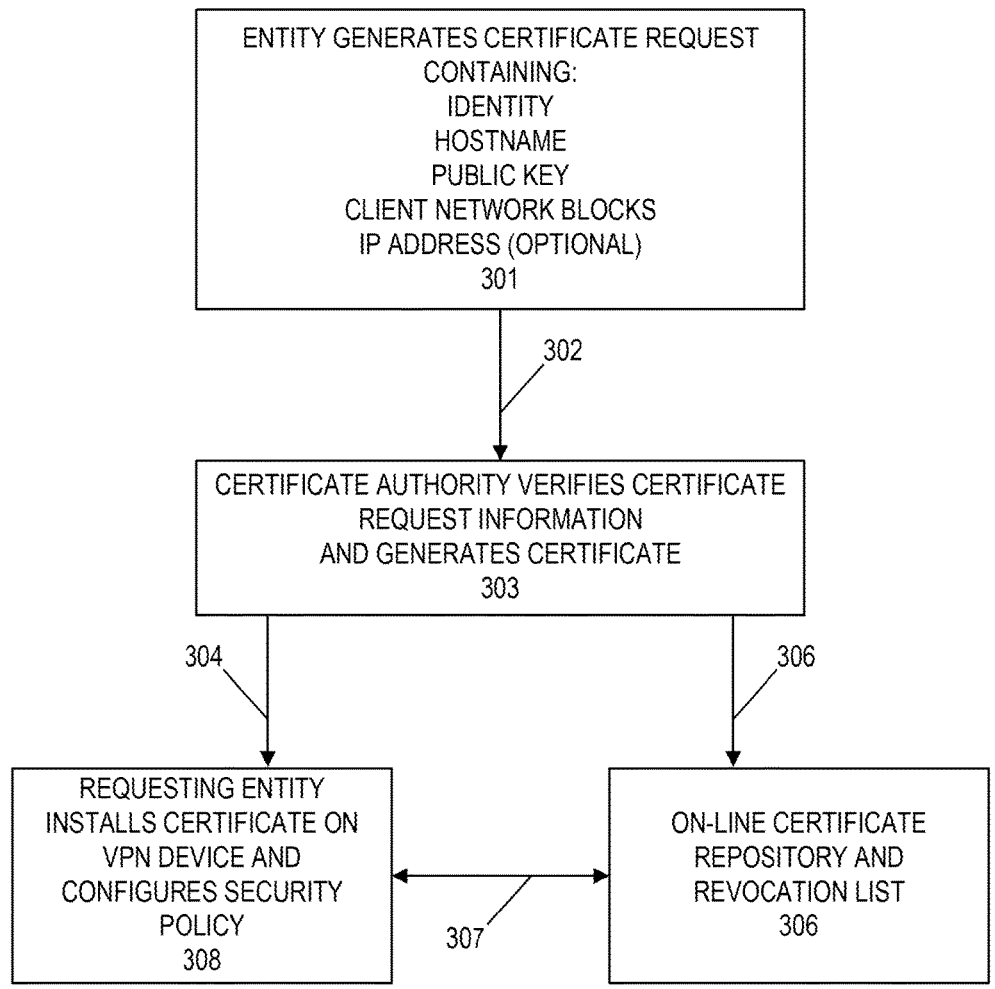
FIG. 3 shows a process flow for setting up a VIN device.

FIG. 3 shows a process flow for setting up a VPN device. Prior to requesting a certificate, an entity establishes an account with a selected certification authority. The entity selects the certification authority based on, for example, a degree of trust that the entity has in the particular certification authority. Such a selected certification authority can be linked through a "chaining link" to a top-level certification authority that has cryptographically signed a certification for the selected certification authority. When setting up the account, the entity communicates information, such as user name, domain name (i.e., a secure domain name such as .scom), organization/company name, organization unit/division, and address information to the selected certification authority by, for example, facsimile. Additional information that is communicated to the selected certification authority includes a password that will be used by the entity so that a certificate request can be submitted on-line once the account has been opened by the certification authority.

At block 301, the entity generates a certificate request by preferably using the password for accessing a web page hosted by the certification authority having, for example, a graphical user interface for requesting a certificate. The certificate request preferably contains fields for entering traditional VPN parameter information, such as the identity of the entity requesting the certificate, the hostname of the requesting entity, the public key of the requesting entity, the range of Internet IP addresses that the requesting entity would like to use as client network addresses for its VPNs, and VPN parameter information. The certificate request can also optionally include the specific IP address of the VPN device. The certificate request is sent to the certification authority at 202 by, for example, clicking on a send certificate request button displayed on the certificate request page.

At block 303, the certification authority verifies the information and parameters contained in the certificate request. The certification authority also manually verifies that the requested range of client IP addresses is valid by performing reverse domain name queries on the address range to determine ownership of the addresses. This can be done by contacting the Internet Service Provider (ISP) of the requesting entity for determining whether the specified addresses are allocated to the requesting entity, and by doing "traceroute" transactions on the Internet to verify that, in fact, the addresses are being routed through the ISP of the requesting entity. The VPN parameters contained in the certification request are also verified manually.

When all of the information and parameters contained in the certificate request has been verified to be correct, the certification authority generates a cryptographically-signed certificate containing the identity of the requesting entity, the hostname of the requesting entity, the public key information for the requesting entity, the requested range of Internet IP addresses and VPN parameter information. At 304, the requesting entity is notified by, for example, e-mail, that a cryptographically-signed certificate has been published at 305 in an on-line central repository, or database, of certificates 306, such as a DNSSEC. That is, the cryptographically-signed certificate is stored in an on-line central repository 306, such as a password-protected web site, so that the requesting entity can access the signed certificate by submitting a password. The requesting entity then accesses the cryptographically-signed certificate using the password at 307, downloads and installs the certificate on the VPN device and configures security policies at 308. When the entity receives the certificate, the VPN device IP address is published to a central DNS server. Preferably, the only information that is retained in the central repository relating to the signed certification and which is publicly available is the VPN device address associated with a name (i.e., the same name as the name associated with the certificate), the client host address associated with a name, and a valid certificate ID associated with a name (so that the certificate can be revoked). Preferably, the certificate and the public key associated with the certificate are not publicly accessible.

Subsequently when a VPN is initiated, the entity sends the cryptographically-signed certificate to another party contained in a tunnel proposal message. The other party independently verifies the certification authority signature on the certificate and responds by sending to the entity a certificate and VPN parameters for the VPN device controlled by the party. The entity, in turn, independently verifies the certification authority signature on the certificate of the other party. When the certificates of each respective party have been verified, the VPN is then established between the entity and the other party based on the exchanged VPN parameters.

Similarly, when another party wants to establish a tunnel to the VPN device of the entity, the other party obtains the IP address for the secure domain name of the entity from the central DNS server, and sends a tunnel proposal message containing the signed certificate associated with the party to the entity. The entity independently verifies the signature of the certification authority contained in the certification of the party, and responds by sending the certification of the entity to the other party. The other party independently verifies the signature of the certification authority contained in the certification of the entity. Subsequently, a VPN is established between the entity and the other party. Thus, each party retains complete control of access to a certificate.

While only a single on-line repository is implied in FIG. 3, it should be understood that a cryptographically-signed certificate can be published in a plurality of distributed on-line repositories that are controlled by a single certification authority. It should also be understood that the cryptographically-signed certificate can alternatively be published in a plurality of on-line repositories that are each controlled by a different certification authority. Further still, it should be understood that the VPN device IP address can be published to a distributed DNS server system once the information and parameters contained in a certificate request have been verified by a certification authority.

In the event that the certificate request did not include a specific IP address of the VPN device because the request contained a range of IP addresses, the requesting entity can update the IP address of its VPN device within the on-line certificate repository by sending a signed message to the certificate repository having the IP address of the VPN device. According to one embodiment, each certificate request is keyed by a unique scorn domain name. Thus, the features herein may provide strong security, but avoids the situation in which an entity must obtain anew certificate each time a small change in VPN parameters occurs. To this end, the certificate authority can sign the entire address block, or space, owned by the VPN device entity, and that entity can establish a security policy in which only a portion of the address space is used for client addresses when a VPN tunnel is established to the .scom domain name of the entity. The actual address of the VPN device does not need to be part of the certificate because when a VPN tunnel is established to the device, the device uniquely identifies itself using messages signed by the private key associated with the VPN device. So, each VPN device can later securely publish its address to a DNS server so other parties can find the VPN device by name on that particular IF address. When the actual address of the VPN device is verified, the new IP address of the VPN device is published to the central repository and/or DNS.

The VPN device can also optionally publish to the repository a list of entity names to which the central repository should respond, thereby limiting the number of entities that have access to the IP address and certificate of the entity controlling the VPN device. Accordingly, the message from the requesting entity publishing the list of allowed contact names is also signed by the requesting entity, and verified by the on-line repository. The on-line repository verifies information published to it by a party by checking the signature on the publishing message using the certificate of the publisher, and also by checking the certification authority signature on the certificate of the publisher.

Figure 4:
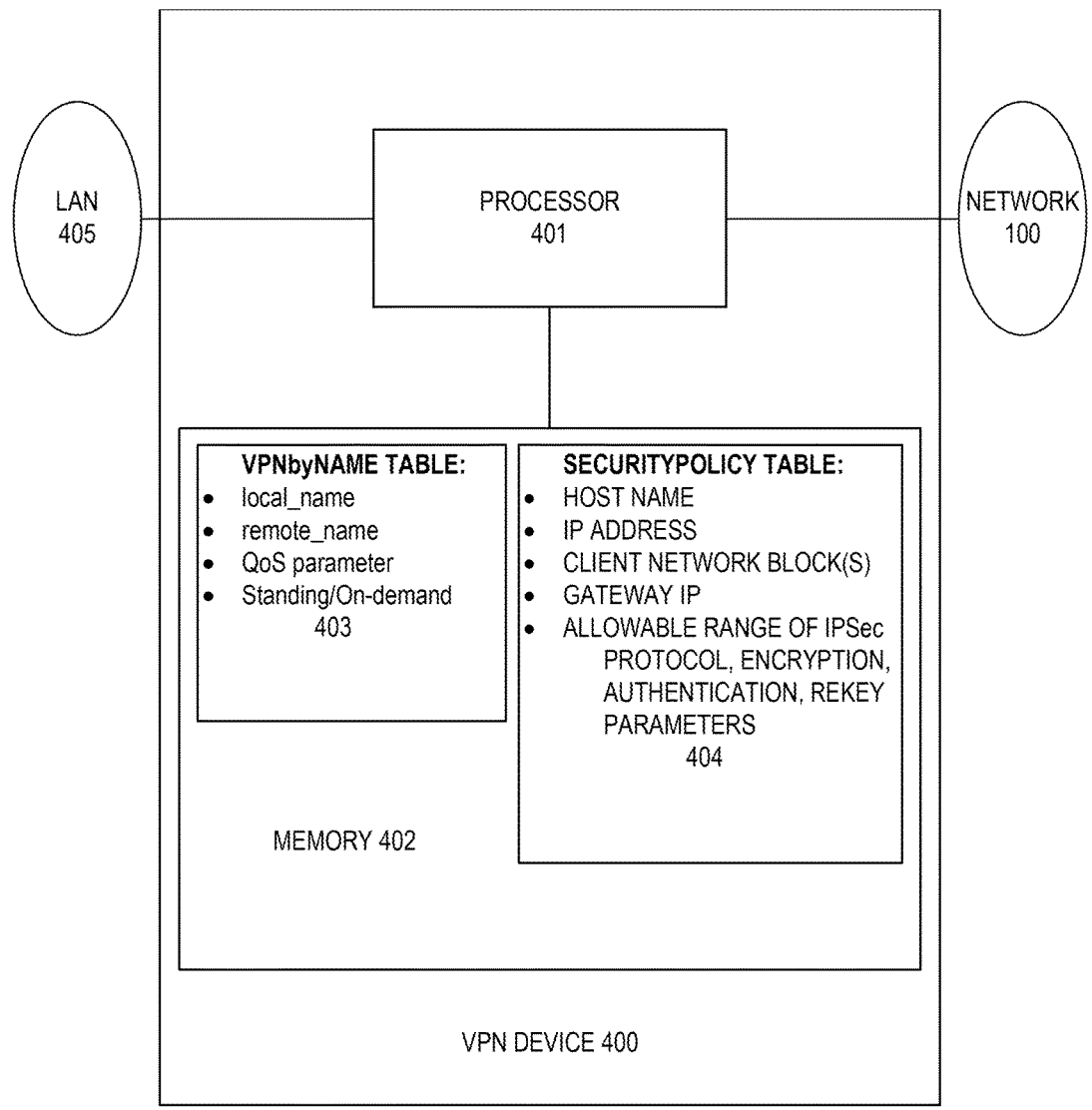
FIG. 4 is a functional block diagram of a portion of a VPN device.

FIG. 4 shows a functional block diagram of a VPN device 400. VPN device 400 includes a processor 401 and a memory 402. Memory 402 stores information that is used for establishing a VPN in the form of a VPNbyName table 403 and a SecurityPolicy table 404. Memory 402 also stores other commands and data that are used in a well-known manner by processor 401 for providing various well-known system operating and overhead function capabilities. VPN device 400 is interposed, for example, between a LAN 405 and a telecommunications network 100. Terminal devices (not shown) that are connected to LAN 405 send requests to VPN device 400 over LAN 405 using well-known communication protocols for establishing a VPN link over telecommunications network 100. VPN device 400 can alternatively be interposed between a server (not shown) and a network 100. VPN device 400 also receives requests from other VPN devices (not shown) over telecommunications network 100 for establishing a VPN link to the requesting VPN device.

Information contained in VPNbyName table 403 and SecurityPolicy table 404 is used by VPN device 400 for instantiating a VPN link. Preferably, VPNbyName table 403 contains a list of VPN connection rules by name. The rules are preferably specified by a source/destination designation, referred to herein as a VPN name pair. A VPN name pair sets forth a local name (i.e., a local name corresponding to a certificate held by the local VPN device), and a remote name for a VPN. The type of VPN connection is also specified for each name rule, such as whether a standing VPN link should be maintained or whether an on-demand VPN link should be established in response to a connection request. A bandwidth and/or quality of service (QoS) rule can optionally be specified for a link.

An exemplary policy can be defined so that a VPN device will accept an input from a DNS proxy or a modified DNS server and/or will automatically attempt to instantiate a VPN link based on a destination name. Moreover, the VPN name pair rules in VPNbyName table 403 can be specified using wildcard flags. For example, a VPN device having a local name of locality.company.com can have a remote name entry of *.company.com for either maintaining a standing VPN with every *.company.com VPN device or for allowing a VPN of opportunity connection with from any *.company.com VPN device. As used herein, the phrase "standing VPN" means a VPN connection that is maintained on a more or less constant basis. A rule associated with a standing VPN can be defined so that VPN device 400 determines on a user-defined periodic basis whether a standing VPN connection is in place, and if not, attempts to reestablish the VPN connection. Also as used herein, the phrase "VPN of opportunity" means a VPN connection that is created on demand or in response to a request to a VPN device that is registered with a central certificate server (repository).

The wildcard flag for specifying a VPN name pair can be extended to a wildcard that includes all names in which VPN's of opportunity are automatically established with all VPN devices that are registered with the central certificate server. For example, when the VPN device 400 receives an .scom request for establishing a VPN to another site, VPN device 400 looks in VPNbyName table 403 for the local name that is to be used by VPN device 400 for representing VPN device 400 to the other site. For instance, when a user on the node1.acme.scom LAN wants to look up the host www.node2.acme.scom and VPNbyName table 403 contains rule local_name nodelacme.scom, remote_name=*.acme.scom, then the connection rule would automatically allow an outbond VPN request to www.node2.acme.scom. Accordingly, the VPN device at www.node2.acme.scom, would also need a matching connection rule local_name=www.node2.acme.scom, remote_name=*.acme.scom contained within the VPNbyName table so that the VPN request would be accepted. The VPN device at www.node2.acme.scom would authenticate the inbound VPN request and respond accordingly so that the VPN will be set up.

SecurityPolicy table 404 associates a local name (i.e., the scorn name that is being used for representing the VPN device on the network) with a particular signed certificate. A host computer can have several local names that are each tied to a respectively different security policy, signed certificate and the VPN network parameters tier one side of a VPN. Specifically, for each local name in SecurityPolicy table 404, SecurityPolicy table 404 contains information relating to the client network address block, the IP address of the VPN device, the gateway IP address, and the allowable range of VPN security parameters (including minimum and maximum acceptable encryption algorithms, key lengths, and rekey rates). Accordingly, the client network address block for the local name must be within the client network address block that has been verified and signed by the certification authority (i.e., included in the signed certificate). The IP address for the local name must be within the client network address block that has been signed by the certification authority.

When VPN device 400 receives a request for establishing a VPN from a terminal device (not shown) connected to LAN 405 that specifies a VPN name pair, i.e., a particular local name and a particular remote name, processor 401 queries VPNbyName table 403 for constraints that are to be adhered to when establishing the requested VPN, and queries Security Policy table 404 for network parameters that are to be used by VPN device 400 when establishing the requested VPN. The features herein allow LAN-to-LAN VPNs to be established by, for example, adding name pair rules to VPNbyName table 403, without requiring that complete entries be entered into a VPN device, such as all of the parameters described in connection with FIG. 1, for each separate VPN tunnel.

Figure 5:
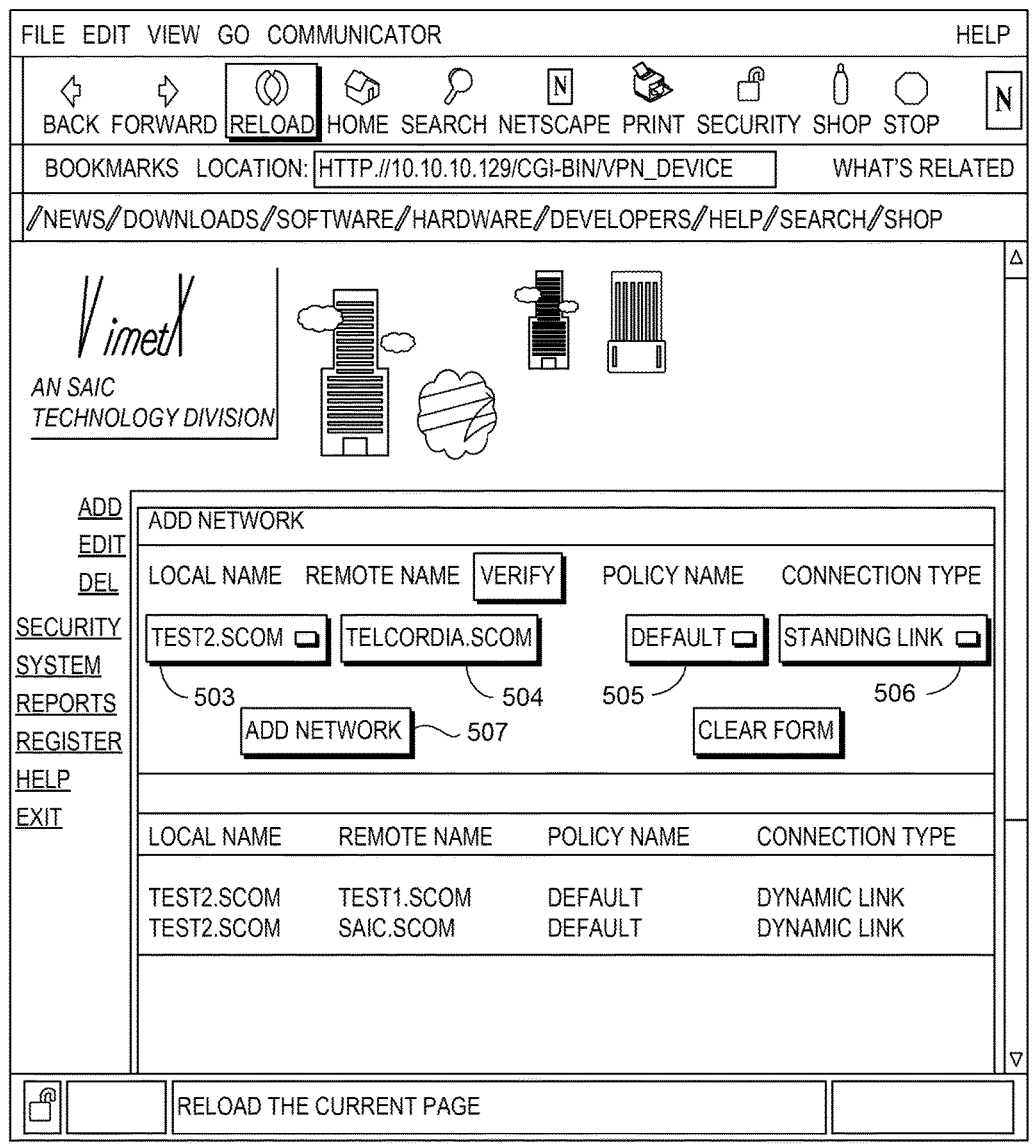
FIG. 5 shows a portion of an exemplar graphical user interface for administering VPNs.

FIG. 5 shows a portion of an exemplary graphical user interface 500 for administering VPNs. A portion 501 of interface 500 allows a local system administrator to add a VPN name pair to VPNbyName table 403. A portion 502 of interface 500 allows a local system administrator to select and edit VPNbyName parameters and security policy rules for an existing VPN name pair. When a new VPN name pair is added, the local name is entered and/or selected from a list of available local names at field 503. The remote name of the VPN name pair is entered into field 504. A policy name that is to be associated with the VPN name pair is selected at field 505, and whether a VPN established for the VPN name pair is a standing link or a link of opportunity is selected at field 506. A new VPN name pair is added to VPNbyName table 403 by, for example, clicking on Add Network field 507. An existing VPN name pair can be edited or deleted by selecting the VPN name pair in portion 502, and then clicking on the appropriate function link (i.e., edit or delete) indicated at 508.

Another aspect provides a secure exchange of VPN parameters between sites when each VPN is established. The conventional ISAKMP/IKE IPSEC session initiation approach can be used as a framework for exchanging all of the data needed for setting up a VPN. This differs from a conventional ISKAMP/IKE IPSEC session initiation approach by verifying the VPN parameters that are exchanged using the ISAKMP/IKE approach. Notably, the current IPSEC VPN approach requires that a central administrator independently verify the client network blocks for each party by manually providing the VPN parameters to the VPN software when each new tunnel is created. In contrast, the features herein provide that the client network blocks are exchanged via ISAKMP/IKE and then are verified to be within the range of the client network block on the certificate for a VPN device. Additional VPN parameters that are exchanged and verified can include the client network block, the IP address of the VPN devices, and the gateway IP address. Thus, using an outside trusted third-party certification authority for verifying client network block parameters allows all of the VPN parameters to be securely exchanged when a VPN is established, and thereby allowing a VPN to be specified by a only a name pair.

Figure 6:
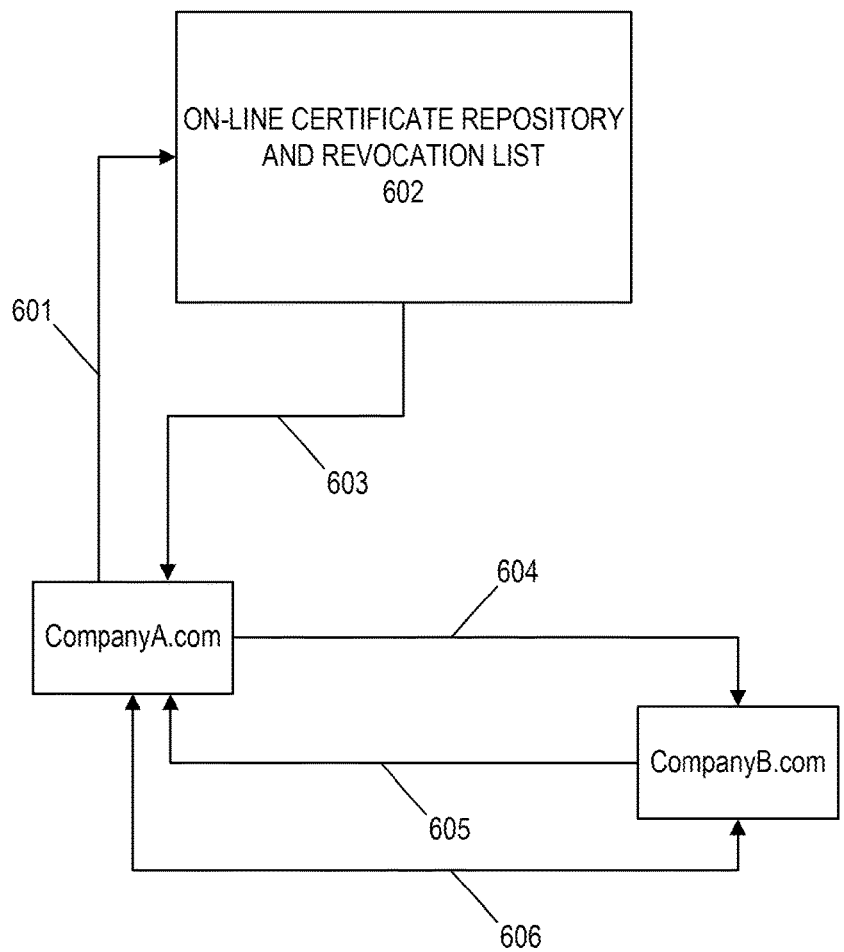
FIG. 6 shows a process flow for an exchange of parameters for initiating a VPN tunnel.

FIG. 6 shows a process flow of an exchange of parameters for initiating a VPN. In FIG. 6, a companyA.com VPN device intends to initiate a VPN connection with a VPN device at companyBcom. First, the companyA.com VPN device sends a request at 601 to a central certificate repository at 602 (or a central DNS) requesting the IP address (i.e. the .scom IP address) for the remote name of a VPN name pair. The central certificate repository can optionally verify the identity of companyA.com based on the public key contained in the request, and optionally determine whether there exists a policy rule (specified by companyB.com) that prevents the repository from responding to the request from companyA.com with the information about companyB.com. In the event that there is no policy rule blocking a reply to company.A.com, the central certificate repository then sends a message to companyA.com at 603 containing the IP address for companyB.com.

The VPN device at companyA.com uses the .scom address information for contacting companyB.com by generating a VPN tunnel proposal message that contains the certificate and security policy data of CompanyA.com. CompanyA.com also signs the VPN tunnel proposal message. The signed VPN tunnel proposal message is then sent to CompanyB.com at 604 via, for example, the Internet.

When the VPN device of companyB.com receives the VPN tunnel proposal message from the companyA.com, the VPN device of companyB.com initially determines whether it should respond to the tunnel proposal message based on a policy rule that prohibits a reply to companyA.com. When no policy rule exists preventing the VPN device of companyB.com from responding to the VPN of companyA.com, the VPN device of companyB.com determines whether a valid entry in a locally-stored VPNbyName table matches the name of the VPN device for companyA.com (i.e., remote name from the point of view of companyB.com) to the name of the VPN device of companyB.com. (i.e., the local name from the point of view of companyB.com). The VPN device of companyB.com verifies that the signature on the message sent by companyA.com is valid by contacting the central repository for the public key for companyA.com. The VPN device of companyB.com also verifies that the client network address block proposed by companyA.com is within the network address block that was verified and signed by the certification authority. The certificate for companyA.com is verified (i.e., the certification authority signature is correct and a validity period set by the certification authority for the certificate covers the current date/time). Finally, the VPN device of companyB.com verifies that it can negotiate a security policy with companyA.com by examining any proposed algorithms contained in the tunnel proposal message, such as an encryption algorithm, an integrity check algorithm, a rekey rate, client network blocks, a tunnel mode, key lengths, and rekey rates. CompanyB.com must be able to find an intersection with the allowable range of these values in its security policy so that a VPN can be established.

When all of these steps are completed, the VPN device of companyB.com sends a signed VPN tunnel proposal response to companyA.com at 605 containing the signed certificate, security policy, and IP gateway address for companyB.com. The VPN device of companyA.com receives the reply message and performs a similar process of verification of the information provided by companyB.com.

Once both companyA.com and companyB.com are satisfied with their respective verifications of the VPN parameters contained in the tunnel proposal messages, both companyA.com and companyB.com then have all the information necessary for establishing a VPN tunnel. Initiation of the VPN can be performed based on an IPSEC VPN, such as by performing an ISAKMP/IKE key exchange process at 606.

It should be understood that any and all of the processes described above could be performed by a computer-based device. It should also be understood that any and all of the processes described herein could be stored on a computer-readable medium in the form of computer-executable instructions.

While the features herein have been described in connection with the illustrated embodiments, it will be appreciated and understood that modifications maybe made without departing from the true spirit and scope of the invention.

The invention claimed is:

1. A method for certifying a device for communicating securely over a network, the method comprising:
   receiving, at a certification authority from the device, a request to generate a certificate for the device to communicate securely with other devices over the network, the request including a name of the device and at least one communication link parameter, wherein the name is used to be used by the other devices to communicate with the device using an encrypted link;
   verifying, at the certification authority, the at least one communication link parameter;
   generating, using at least one computer processor, a cryptographically-signed certificate for the device, the cryptographically-signed certificate containing the name of the device and the verified at least one communication link parameter; and
   making the cryptographically-signed certificate available to the device.

2. The method of claim 1, wherein the certification authority is a name server.

3. The method of claim 1, wherein the at least one communication link parameter includes at least one of an identity of the device, a range of addresses used by the device when communicating securely, a security parameter used by the device when communicating securely, a Quality-of-Service (QoS) parameter used by the device when communicating securely, an address of the device, a gateway address for the device, or a hostname of the device.

4. The method of claim 1, wherein the at least one communication link parameter includes a security parameter used by the device when communicating securely.

5. The method of claim 4, wherein the security parameter includes a east one of an encryption algorithm, a key length, or a rekey rate.

6. The method of claim 1, wherein the at least one communication link parameter includes a Quality-of-Service (QoS) parameter used by the device when communicating securely.

7. The method of claim 6, wherein the QoS parameter includes a bandwidth requirement of the device when communicating securely.

8. The method of claim 1, further comprising:
   associating, by the certification authority, the verified at least one communication link parameter with the name of the device; and
   storing the associated name and the verified at least one communication link parameter in a repository.

9. The method of claim 1, wherein making the cryptographically-signed certificate available to the device includes making the cryptographically-signed certificate available for download and installation by the device.

10. The method of claim 1, wherein the device uses the cryptographically-signed certificate when proposing a connection to another device.

11. The method of claim 1, wherein communicating securely includes communicating over an encrypted communication link.

12. The method of claim 1, wherein communicating securely includes communicating over a communication link between devices in a virtual private network.

13. The method of claim 1, wherein the device is a mobile device.

14. The method of claim 13, wherein the mobile device is a phone.

15. A certification authority system for certifying devices for communicating securely over a network, comprising:
   a repository; and
   one or more processors configured to:
   receive, from a device, a request to generate a certificate for the device to communicate securely with other devices over the network, the request including a name of the device and least one communication link parameter, wherein the name is used to be used by the other devices to communicate with the device using an encrypted link;
   verify the at least one communication link parameter;
   generate a cryptographically-signed certificate for the device, the cryptographically-signed certificate containing the name of the device and the verified at least one communication link parameter; and
   make the cryptographically-signed certificate available to the device.

16. The certification authority system of claim 15, wherein the certification authority is a domain name server.

17. The certification authority system of claim 15, wherein the at least one communication link parameter includes at least one of an identity of the device, a range of addresses used by the device when communicating securely, a security parameter used by the device when communicating securely, a Quality-of-Service (QoS) parameter used by the device when communicating securely, an address of the device, a gateway address for the device, or a hostname of the device.

18. The certification authority system of claim 15, wherein the at least one communication link parameter includes a security parameter used by the device when communicating securely.

19. The certification authority system of claim 18, wherein the security parameter includes at least one of an encryption algorithm, a key length, or a rekey rate.

20. The certification authority system of claim 15, wherein the at least one communication link parameter includes a Quality-of-Service (QoS) parameter used by the device when communicating securely.

21. The certification authority system of claim 20, wherein the QoS parameter includes a bandwidth requirement of the device when communicating securely.

22. The certification authority system of claim 15, wherein the one or more processors are further configured to:
   associate the verified at least one communication link parameter with the name of the device; and
   store the associated name and the verified at least one communication link parameter in the repository.

23. The certification authority system of claim 15, wherein making the cryptographically-signed certificate available to the device includes making the cryptographically-signed certificate available for download and installation by the device.

24. The certification authority system of claim 15, wherein the device uses the cryptographically-signed certificate when proposing a connection to another device.

25. The certification authority system of claim 15, wherein communicating securely includes communicating over an encrypted communication link.

26. The certification authority system of claim 15, wherein communicating securely includes communicating over a communication link between devices in a virtual private network.

27. The certification authority system of claim 15, wherein the device is a mobile device.

28. The certification authority system of claim 27, wherein the mobile device is a phone.

* * * * *

UNITED STATES PATENT AND TRADEMARK OFFICE
CERTIFICATE OF CORRECTION

PATENT NO. : 9,673,988 B2  
APPLICATION NO. : 14/827243  
DATED : June 6, 2017  
INVENTOR(S) : Victor Larson Page 1 of 1

It is certified that error appears in the above-identified patent and that said Letters Patent is hereby corrected as shown below:

In the Claims

Claim 5, Column 12, Line 53, "a east" should read as --at least--

Signed and Sealed this  
Seventeenth Day of July, 2018

Andrei Iancu  
*Director of the United States Patent and Trademark Office*